US009972068B2

(12) United States Patent
van Leeuwen et al.

(10) Patent No.: US 9,972,068 B2
(45) Date of Patent: May 15, 2018

(54) METHOD FOR REGISTERING AND VISUALIZING AT LEAST TWO IMAGES

(71) Applicant: KONINKLIJKE PHILIPS N.V., Eindhoven (NL)

(72) Inventors: Marinus Bastiaan van Leeuwen, Eindhoven (NL); Jelte Peter Vink, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days. days.

(21) Appl. No.: 15/115,389

(22) PCT Filed: Jan. 29, 2015

(86) PCT No.: PCT/EP2015/051745
§ 371 (c)(1),
(2) Date: Jul. 29, 2016

(87) PCT Pub. No.: WO2015/117875
PCT Pub. Date: Aug. 13, 2015

(65) Prior Publication Data
US 2017/0011489 A1    Jan. 12, 2017

(30) Foreign Application Priority Data
Feb. 4, 2014 (EP) .................... 14153744

(51) Int. Cl.
*G06K 9/00* (2006.01)
*G06K 9/32* (2006.01)
(Continued)

(52) U.S. Cl.
CPC .......... *G06T 3/0075* (2013.01); *G06T 3/0081* (2013.01); *G06F 3/0485* (2013.01);
(Continued)

(58) Field of Classification Search
USPC ................................... 382/294, 133
See application file for complete search history.

(56) References Cited

U.S. PATENT DOCUMENTS 6,859,199 B2 * 2/2005 Shi .............. G06F 3/0317
345/156
7,859,529 B2 * 12/2010 Tokumo ........... H04N 19/597
345/419
(Continued)

FOREIGN PATENT DOCUMENTS

EP    2639765 A2    9/2013

OTHER PUBLICATIONS

Rojo, Marcial Garcia et al "Critical Comparison of 31 Commercially Available Digital Slide Systems in Pathology" International Journal of Surgical Pathology, vol. 14, No. 4, Oct. 2006, pp. 285-305.
(Continued)

*Primary Examiner* — Kathleen Y Dulaney (57) ABSTRACT

The present invention relates to a method for registering and visualizing at least two images, the method comprising the steps of: measuring (S1) a navigation speed used by a user during a scrollable and/or zoomable visualization of a first image of the at least two images and comparing the navigation speed with a navigation speed threshold value; visualizing (S2) the first image by solving deformations of the first image using a first level of computational load, if the navigation speed is below the navigation speed threshold value; and visualizing (S3) the first image by solving deformations of the first image using a second level of computational load, if the navigation speed is above the navigation speed threshold value.

11 Claims, 3 Drawing Sheets

(51) Int. Cl.
*G06T 3/00* (2006.01)
*G06F 3/0485* (2013.01)

(52) U.S. Cl.
CPC .......... *G06T 2207/10008* (2013.01); *G06T 2207/10056* (2013.01); *G06T 2207/30004* (2013.01)

(56) References Cited

U.S. PATENT DOCUMENTS

| | | | | |
|---|---|---|---|---|
| 8,274,592 | B2* | 9/2012 | Watkins | G06F 3/0485 345/173 |
| 2004/0047497 | A1* | 3/2004 | Daw | G06T 19/00 382/128 |
| 2005/0105782 | A1* | 5/2005 | Abiko | G06K 9/00026 382/124 |
| 2006/0264746 | A1 | 11/2006 | Frisa | |
| 2008/0013852 | A1 | 1/2008 | Ghosh | |
| 2008/0309632 | A1* | 12/2008 | Westerman | G06F 3/038 345/173 |
| 2009/0016641 | A1* | 1/2009 | Paladini | G06T 15/08 382/278 |
| 2009/0028414 | A1* | 1/2009 | Crandall | G02B 21/002 382/133 |
| 2010/0125786 | A1* | 5/2010 | Ozawa | G06F 3/04845 715/702 |
| 2010/0157079 | A1 | 6/2010 | Atanassov | |
| 2012/0068928 | A1* | 3/2012 | Bruss | G06F 3/038 345/163 |
| 2013/0016886 | A1 | 1/2013 | Schoenmeyer | |
| 2013/0089249 | A1 | 4/2013 | Mueller | |
| 2013/0243302 | A1* | 9/2013 | Liu | G06T 3/0075 382/133 |
| 2013/0250091 | A1* | 9/2013 | Takayama | H04N 7/18 348/80 |
| 2014/0278088 | A1* | 9/2014 | Matsuo | G09B 29/005 701/532 |
| 2015/0123993 | A1* | 5/2015 | Ohba | G09G 5/00 345/629 |

OTHER PUBLICATIONS

Mueller, Dan et al "Real-time deformable registration of multi-modal whole slides for digital pathology" Computerized Medical Imaging and Graphics, vol. 35, 2011, pp. 542-556.

Lowe, David G. "Distinctive Image Features from Scale-Invariant Keypoints", International Journal of Computer Vision, vol. 60, No. 2, 2004, pp. 91-110.

* cited by examiner

METHOD FOR REGISTERING AND VISUALIZING AT LEAST TWO IMAGES

CROSS-REFERENCE TO PRIOR APPLICATIONS

This application is the U.S. National Phase application under 35 U.S.C. § 371 of International Application No. PCT/EP2015/051745, filed on Jan. 29, 2015, which claims the benefit of European Patent Application No. 14153744.9, filed on Feb. 4, 2014. These applications are hereby incorporated by reference herein.

FIELD OF THE INVENTION

The present invention relates to a method for registering and visualizing at least two images and to an imaging system for digital image registration and visualization.

BACKGROUND OF THE INVENTION

US 2013/0089249 A1 describes an image processing method in digital pathology. The described method for processing processes a first digital image, representing a sample in a region, and which image has been acquired from the sample by means of a microscopic imaging system. The image is stored in a multi-resolution image data structure, retrieving a sub-region of the first digital image at a first resolution, executing a transform function on the retrieved sub-region, the transform function modifying a content of the sub-region according to at least one metric derived from a second resolution representation of the first digital image.

US 2008/013852 A1 describes a system, a method and a computer program product for improving quality of images. According to the described method, the pixels of the input image are used to generate two lists of pixels based on two different scale space values. Thereafter, the two pixel lists are processed to obtain an output image with improved quality. US 2010/157079 A1 describes systems and methods to selectively combine images. An apparatus includes a registration circuit configured to generate a set of motion vector data based on first image data corresponding to a first image and second image data corresponding to a second image.

US 2013016886 A1 describes a method for high-resolution digital imaging of adjacent slices of tissue samples. Values associated with image objects detected in each tile are calculated. The tiles in adjacent images are co-registered. A first hyperspectral image is generated using a first image, and a second hyperspectral image is generated using a second image.

US2012/068928A1 describes a device and a method for examining and manipulating specimen slides in a digital pathology environment involves a set of operations. By moving the scroll wheel quickly in either direction may be configured as an instruction to jump to a minimum or maximum magnification, or to progress by more than the next sequential increment, obviating the loading of intermediate magnification.

SUMMARY OF THE INVENTION

There may be a need to improve the digital image processing for fast or real-time complex image registration and visualization.

These needs are met by the subject-matter of the independent claims. Further exemplary embodiments are evident from the dependent claims and the following description.

An aspect of the invention relates to a method for registering and visualizing at least two images, the method comprising the steps of: measuring a navigation speed used by a user during a scrollable and/or zoomable visualization of a first image of the at least two images and comparing the navigation speed with a navigation speed threshold value; visualizing the first image by solving deformations of the first image using a first level of computational load, if the navigation speed is below the navigation speed threshold value; and visualizing the first image by solving deformations of the first image using a second level of computational load, if the navigation speed is above the navigation speed threshold value.

A further aspect of the invention relates to an imaging system for digital image registration and visualization, the imaging system comprising: an image processor configured to compare a navigation speed with a navigation speed threshold value, wherein the navigation speed is used by a user during a scrollable and/or zoomable visualization of a first image of the at least two images; the image processor is further configured to, if the navigation speed is below the navigation speed threshold value, visualize the first image by solving deformations of the first image using a first level of computational load; the image processor is further configured to, if the navigation speed is above the navigation speed threshold value, visualize the first image by solving deformations of the first image using a second level of computational load; and a display adapted to display the at least two images.

The present invention allows performing real-time or fast complex image registration and visualization. Two images are used for registration. An algorithm that identifies the coarse transformation between both images is performed. An algorithm that identifies the fine transformation between both images is conducted. An algorithm that indicates the amount of change between successive images is performed which is used to trigger the transition from coarse to fine and vice versa.

The present invention advantageously provides a method for registering two big size images such as digital pathology images, so that registration happens as quickly as possible in order to reduce the feedback time to the user. The method is based on a coarse registration and visualization followed by a fine registration and visualization.

An image of the sample region of interest (ROI) and/or of the remaining sample is generated after the isolation of the sample ROI. This image may be generated with the same image generating unit that also generated the image of the whole sample, or with a separate device. The image of the sample ROI (or of the remainder of the sample) can be compared to the image of the whole sample and particularly to the selected image ROI, thus allowing for a verification if the actual sample ROI corresponds to the desired region of interest or not.

According to an exemplary embodiment of the invention, the step of solving deformations of the first image comprises an image translation of the first image, an image rotation of the first image, a scale variation of the first image, a further linear deformation of the first image or a non-linear deformation of the first image.

According to an exemplary embodiment of the invention, the navigation speed used by the user during the scrollable and/or zoomable visualization of the first image is obtained from a user interface device.

In case of registration of two digital images, the navigation speed can be advantageously determined by the amount of time since the last update request of the user. In case the user is constantly panning and/or zooming, the fine transformation is omitted. In case the user does not change his viewpoint, e.g. no panning and/or zooming, the fine transformation is performed.

According to an exemplary embodiment of the invention, the navigation speed used by the user during the scrollable and/or zoomable visualization of the first image is measured using a SIFT feature matching.

According to an exemplary embodiment of the invention, the method further comprises the step of performing a local registration of the at least two images.

According to an exemplary embodiment of the invention, if the navigation speed is above the navigation speed threshold value, the solving of deformations of the first image comprises applying translational and rotational transformations; and, if the navigation speed is below the navigation speed threshold value, the solving of deformations of the first image comprises applying non-linear refinements.

According to an exemplary embodiment of the invention, if the navigation speed is above the navigation speed threshold value, the solving of deformations of the first image comprises applying transformations with a first resolution level; and, if the navigation speed is below the navigation speed threshold value, the solving of deformations of the first image comprises applying transformations with a second resolution level, wherein the first resolution level is lower than the second resolution level.

The invention further relates to digital image analysis as used for molecular diagnostics, molecular pathology, in particular for oncology applications, biological sample analysis, chemical sample analysis, food analysis, and/or forensic analysis. Molecular diagnostics may for example be accomplished with the help of magnetic beads or fluorescent particles that are directly or indirectly attached to target molecules.

A more complete appreciation of the invention and the attendant advantages thereof will be more clearly understood by reference to the following schematic drawings, which are not to scale, wherein.

DETAILED DESCRIPTION OF EMBODIMENTS

The illustration in the drawings is schematically and not to scale. In different drawings, similar or identical elements are provided with the same reference numerals. The term "navigate" as used in the present patent application refers to any movement, including scrolling, panning, zooming or tilting, of the user's view across what is apparently a larger image that is not wholly seen. In other words to scroll according to the present patent application means to change one's view of data on a computer's display. The scrolling may take place in discrete increments, perhaps one or a few parts of the image at a time or continuously.

Generally, identical parts, units, entities or steps are provided with the same reference symbols in the figures.

Pathology diagnostic investigation of patient material (tissue and cells) is the basis of many treatment decisions, in particular in oncology. Standard, thin slices from a biopsy are presented on microscope slides and stained according to certain protocols to visualize the morphology of the tissue. More recently in situ staining for disease-specific biomarkers is being developed for companion diagnostics of targeted drugs. Assessment may be done with a bright field microscope. Slides need to be stored after investigation for a long period as back-up in case the diagnosis needs to be re-assessed.

Digital pathology is a new technology in which the microscope is replaced by a digital scanner which scans the stained tissue sections automatically and stores the images in digital format with sufficient resolution and color rendering that the pathologist can do the same diagnosis from the digital image as he/she would do directly at the microscope. The latter means that the digital image can replace the physical slide. Digital images may be stored instead of the slides.

Next to the above forms of analysis, tissue and cell biopsies may also be investigated with molecular methods (abbreviated as "molecular diagnostics" or "MDx"), like q-PCR and sequencing. This so-called molecular pathology is increasing in importance with the advent of new molecular biomarkers. Often the pathologist decides based on the morphological information to run a molecular test to identify the biological characteristics of the cancer tissue for the right therapy choice. Since many molecular biomarkers cannot be quantified in situ on tissue or at least not with the required precision a separate molecular diagnostics test, like PCR or sequencing is carried out on a sample which is taken from the biopsy, in general from a coupe that has already been taken from the biopsy. This tissue section is processed by cell lysis before the measurement of DNA or mRNA markers. As a consequence the spatial information is lost.

Tumor tissues generally consist of different cell types, not only cancer cells, and even the cancer cells can differ a great deal in molecular constitution in different areas of the tumor. The result of a molecular analysis will therefore depend on the exact composition of the tissue section which is used as sample for the molecular test. The more diluted the cancer cells are, the more insensitive and inconclusive the test result will be. In addition, heterogeneity within the cancer cell population will also cause noise in the MDx assays, reducing sensitivity and specificity as well as reproducibility. Reproducibility is in general a main issue, simply because each sample is unique.

With digital pathology there is currently no possibility to run a molecular test on a subsection of a biopsy coupe. Tests on full coupes have suboptimal precision and sensitivity due to dilution of the target cells with benign cells of different origin (e.g. endothelial, fibroblast and immune cells) and cancer cell heterogeneity.

Manual selection often lacks accuracy and is therefore likely to create contamination, especially for PCR which amplifies even very low concentrations of contamination.

Obtaining a pure fraction of cells of interest can be time consuming and requires a high definition with removal. The aforementioned approach allows relaxing the requirements for selection and balance that with additional parameters that take into account how easy or reliable sections can be removed and control the total size of the selection. For a convenient selection larger, continuous sections are preferred.

The image analysis can provide tabular parameters, like the number and fractions of each identified cell type in the finally dissected tissue. The shape of the area can be limited by design criteria including parameters, like total area, allowable curvatures and connectivity. Based on an algorithm an optimum can be determined given a certain selection algorithm which can be specific for each MDx assay.

In an exemplary embodiment of this approach, a tissue slide may be stained according to a certain clinical indication with a HER2 immuno-histochemistry or immunofluorescent stain, or a combination of staining assays.

The slide may then be scanned by a digital scanner, and the resulting image may be analyzed by a computer program to identify and indicate areas of common features. Those areas may be presented to the pathologist for confirmation and adaptation if necessary or otherwise desirable. From those areas a region of interest, called "sample ROI", may be defined by a software program that represents the part of the sample that is selected for MDx testing.

Typical parameters are annotated to that sample ROI, like the average expression of HER2 in the given example, and the statistical distribution of the expression over the cells. The coordinates of that selected sample ROI may be transmitted to a sample isolation unit that takes care of the physical selection of the sample for MDx. The selected "sample ROI" may be transferred to a transfer device or directly a disposable that is used for MDx testing.

The MDx testing may comprise sample preparation and molecular analysis, like qRT-PCR, qrt-PCR, sequencing or next gen sequencing, or micro-array hybridization, or a combination of these. The results of that analysis may finally be related to the information from the tissue selection algorithm and optionally be interpreted and presented to the pathologist together with the digital image of the tissue in which the sample ROI that was selected for MDx is indicated as well.

Figure 1:
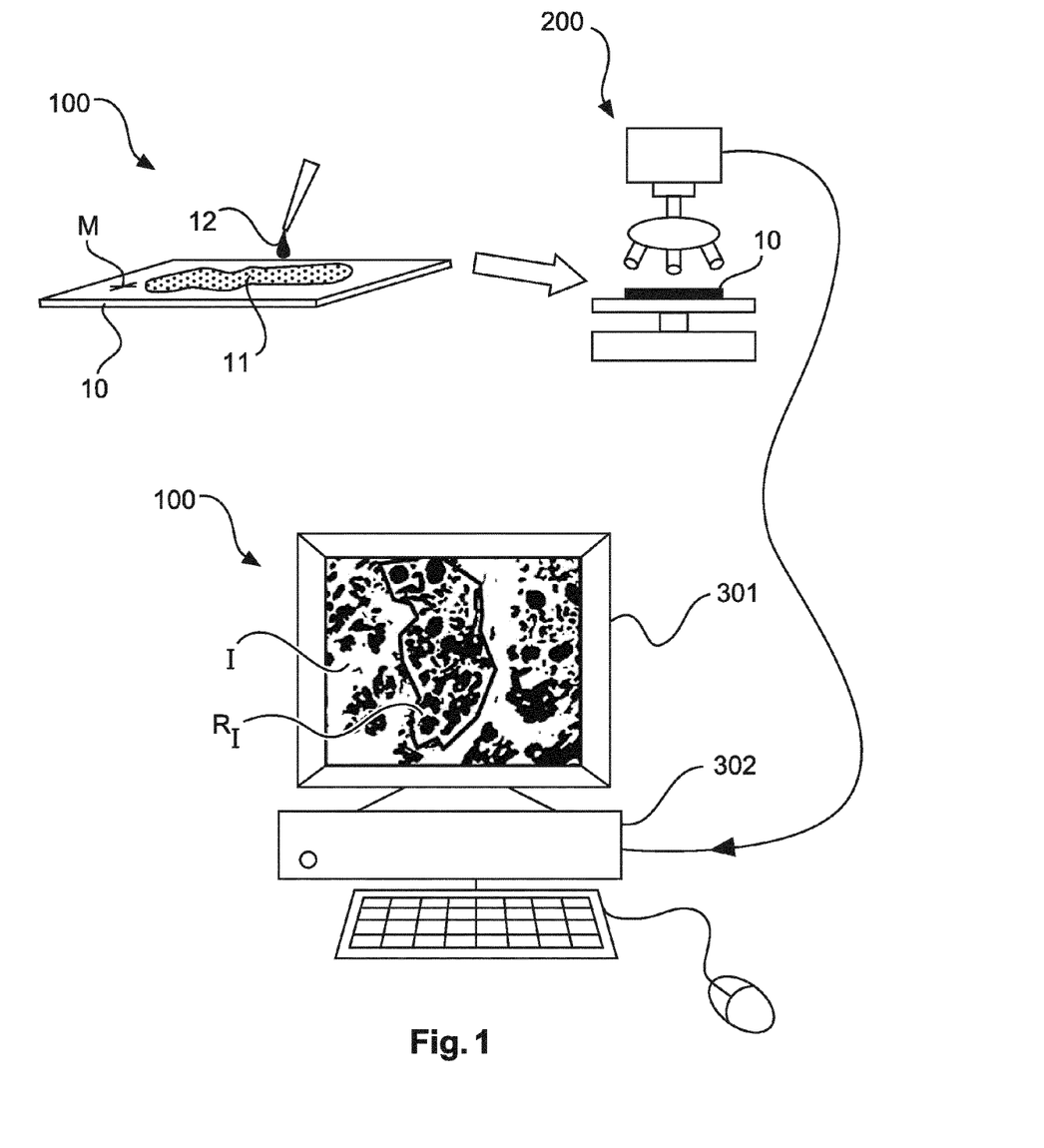
FIG. 1 shows schematically the examination of a sample according to the present invention.

FIG. 1 schematically shows the examination of a sample according to the present invention.

The examination starts at a sample preparation unit 100 in which a slice 11 of body tissue is prepared on a microscope slide 10 serving as a carrier. Typically, tissue samples are obtained by cutting a thin section of about 4-8 microns from a paraffin-embedded biopsy. The so-called coupes are placed on the microscope glass slide 10 on a water film to relax from the micro-toming strain and are then left to dry. Moreover, the sample 11 may optionally be stained by an appropriate stain 12, e.g. by Hematoxylin-Eosin (H&E) or IHC. There are a number of staining protocols available for different applications. Staining protocols can be carried out on the bench manually by dipping the slide with the coupe in different solutions containing the reagents, but can also be performed in an automated fashion.

One or more markers M may be printed on or engraved in the microscope slide 10 that can later serve as reference points for relating image coordinates to actual coordinates on the slide 10. Moreover, the slide 10 with the sample 11 is preferably covered with a cover slip (not shown) in order to allow for a high image quality during later scanning and to guarantee preservation of the sample over long storage time.

After the preparation step, the slide 10 with the sample 11 is transferred to an image generating unit 200, which may particularly be a digital scanning microscope.

A digital image I of the sample is generated by the microscope 200. The microscope is connected to an imaging system 300, which uses the microscope 200 as a video image source and comprises a display 301 and an image processor 302 for digital image processing of the video image source data.

The imaging system 300 may comprise a user interface device, for instance, a mouse or a keyboard, and the imaging system 300 may be configured to provide a scrollable and/or zoomable visualization of a first image and/or the second image. The scrollable and/or zoomable visualization may be performed according to input commands by using the user interface device. A user may vary and control the navigation speed used during the scrollable and/or zoomable visualization of a first image and/or the second image. The imaging system 300 may be configured to provide a visualization of a first image and/or the second image based on various image transformations as used in digital image processing. By means of the image processor 302, algorithms to perform image processing on digital images are used. The algorithms may be applied to the input data and can avoid problems such as the build-up of noise and signal distortion during processing.

Different computational load capacity may be used for the image transformations by the image processor 302, also a maximum threshold of capacity to be used may be defined by the imaging system 300, which is advantageous in case there are multiple users of the same processing unit.

Figure 2:
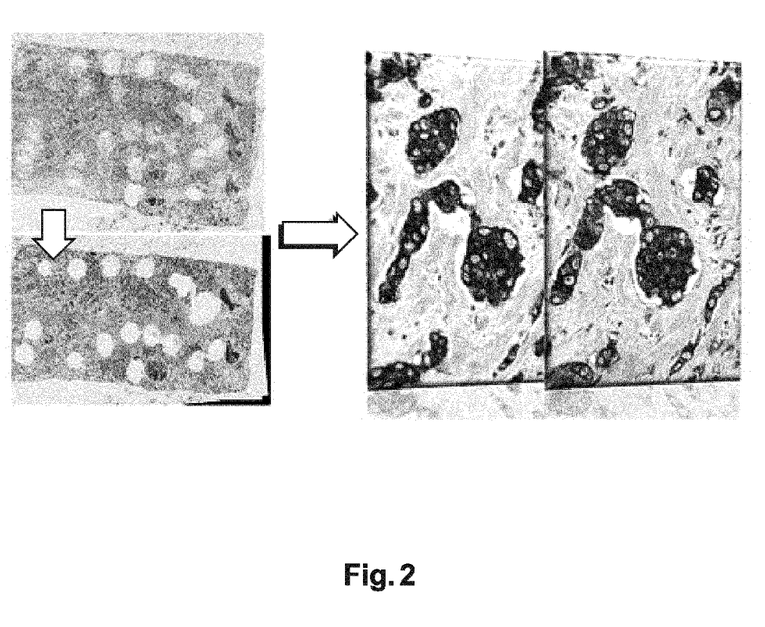
FIG. 2 shows an illustration of image registration of two immunohistochemistry stained slides for explaining the invention.

FIG. 2 shows an illustration of image registration of two immunohistochemistry stained slides. In the upper-left part of FIG. 2, an illustration of misalignment error between both slides is shown. In the lower-left part of FIG. 2, an illustration of registration result of complete image is presented. On the right part of FIG. 2, simultaneous visualization of matching field-of-views in both slides is presented.

Besides analysis of histopathological images, also molecular methods, for instance PCR or sequencing, are used to identify biological characteristics of the (tumor) tissue. Polymerase chain reaction (PCR) is a biochemical technology in molecular biology to amplify a single or a few copies of a piece of DNA across several orders of magnitude, generating thousands to millions of copies of a particular DNA sequence.

In molecular methods, a portion of the tissue is selected for further molecular analysis. As the molecular analysis heavily depends on the exact composition of the selected tissue region, the accuracy of the selection of the Region-of-Interest (ROI) is important. Currently, the ROI is manually selected from the H&E stained sample.

If MDx is selected as next step, one or more consecutive samples are used. One of the reasons for using a new sample is the fact that the H&E sample is sealed between glass plates. Other reasons are the wish for keeping the H&E sample intact for future reference and long term storage (legal reasons) and incompatibility of the H&E stain with MDx.

Typically, the medical specialist will place the second sample (without cover slip) under a microscope and browse the sample to find the tissue part that matches the earlier detected ROI. Depending on the differences in appearance between the H&E sample and the second sample, the retrieval of the ROI in the second sample can be cumbersome. Because of the importance of the correctness of the ROI selection step, means to assist the operator in this step are valuable.

Image analysis algorithms can be developed to match the image data of the selected ROI in the H&E sample against the live video stream of the second sample obtained with the microscope. This process of image matching requires computation time and consequently introduces delay in the image pipeline. Besides image matching, also the visualization of the image matching result will consume computation time, and therefore will add to the delay. As long as the total delay remains small, e.g. above 10 Hz, the delay introduced in the video stream is acceptable. A more complex transformation between samples typically results in longer computation times. Differences in transformation between samples can be large, consisting of simple translation and rotation, but also possible small variation in scale and non-linear local deformations caused by tissue stretching, tears, and folds.

Figure 3:
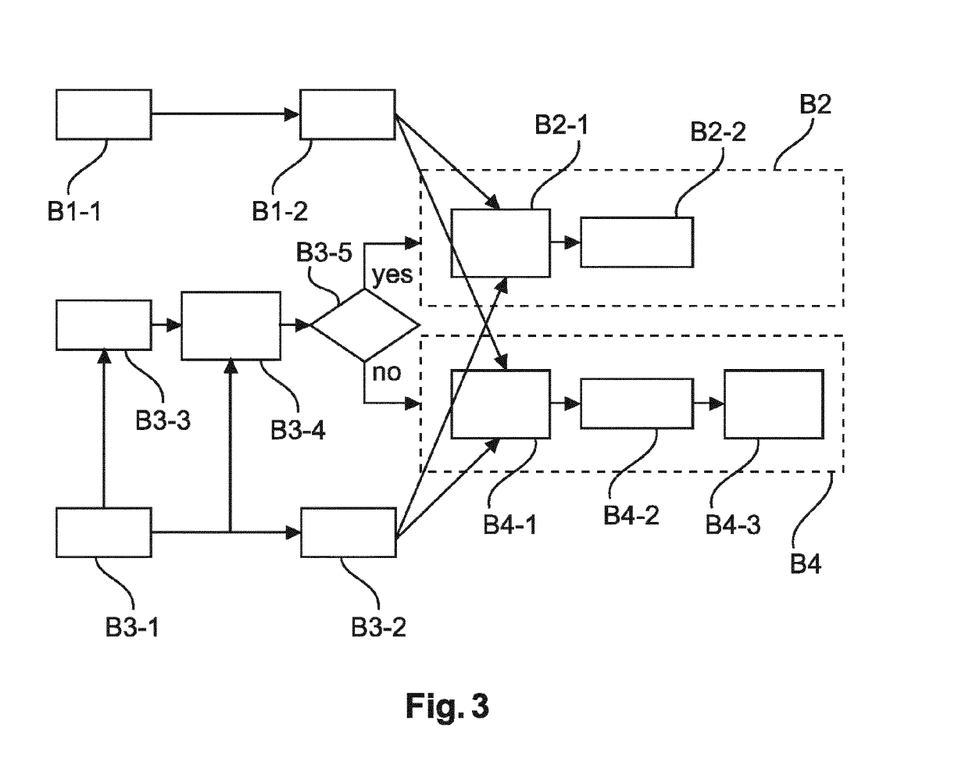
FIG. 3 shows an overview of building blocks according to an exemplary embodiment of the invention.

FIG. 3 shows an overview of building blocks according to an exemplary embodiment of the invention.

FIG. 3 shows the algorithmic structure according to the present invention. Inputs of the algorithm are an image of tissue sample 1 ("reference image") and an image of tissue sample 2 ("target image"). The image content of target image at time t is compared with the target image captured previously and that has been stored in the image buffer. In one embodiment of the present invention, the difference image is computed on a subset of the pixels in the image.

In case of motion or motion above a predefined threshold value or change of magnification, the target image at time t and the target image at time t−1 substantially differ, leading to a complex matching the image with the (complete) reference image leaving insufficient time for non-linear refinement (both estimation of the non-linear deformation as well as visualization). Therefore, we estimate the rigid transformation parameters that describe the simple transformation between the reference image and the target image in terms of only translation {Tx,Ty} and rotation {R} and scale. Initially it is our intention to compensate the registration for change in translation only. However, the estimation of the transformation parameters is likely to become unstable or inaccurate if rotation is ignored.

In case of no motion or only limited computation time is lost in motion estimation, leaving time to estimate the more accurate non-linear transformation parameters that describe the transformation between both images. The visualization of the target image is updated with translation and rotation. In a next step, also the transformation is further refined in the illustration with its non-linearity component.

In case of small motion, wherein small motion refers to motion below a predefined threshold value, displacement can be estimated with relatively simple/efficient motion estimation methods (e.g. based on projected intensities plus 1D correlations). Besides, it is possible to reuse results for the part that is still observed in the field of view. This again leaves room for estimation and visualization of more detailed transformations.

The navigation speed threshold value or motion threshold value may be predefined, for instance, between a range of 0 and 5 images per second, or may be defined in terms of the screen height or the screen width per second, for instance between a range of 0 and 5 screen height or width, respectively, per second. The navigation speed threshold value can be dynamically set, i.e. the threshold value may not represent a fixed value. The navigation speed threshold value may be based on available computational resources.

Building block B1-1 represents a reference image t; building block B1-2 symbolizes a feature extraction subroutine. Building block B2-1 corresponds to an estimate rigid feature transformation, building block B2-2 signifies a registration {Tx,Ty,R} and scale. Building block B3-1 represents a target image t, building block B3-2 symbolizes a feature extraction. Building block B3-3 corresponds to an image buffer, building block B3-4 signifies a computed SIFT based motion estimation or any other motion estimation.

Building block B3-5 is a symbol of a query regarding whether motion is present or whether a navigation speed threshold is surpassed.

Building block B4-1 represents an estimate of a non-linear transformation, building block B4-2 symbolizes a registration in the form of {Tx,Ty,R} and scale. Building block B4-3 corresponds to a registration in the form of {Tx,Ty, non-linear}.

Figure 4:
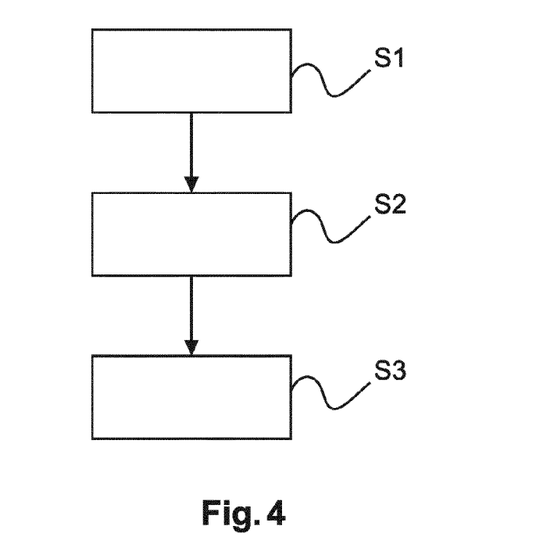
FIG. 4 shows a schematic flowchart diagram of a method for registering and visualizing at least two images according to an exemplary embodiment of the invention.

FIG. 4 shows a schematic flowchart diagram of a method for registering and visualizing at least two images according to an exemplary embodiment of the invention.

The method for registering and visualizing at least two images comprises the following steps.

As a first step of the method, measuring S1 a navigation speed used by a user during a scrollable and/or zoomable visualization of a first image of the at least two images and comparing the navigation speed with a navigation speed threshold value is performed.

As a second step of the method, visualizing S2 the first image by solving deformations of the first image using a first level of computational load is conducted, if the navigation speed is above the navigation speed threshold value.

As a third step of the method, visualizing S3 the first image by solving deformations of the first image using a second level of computational load is performed, if the navigation speed is below the navigation speed threshold value.

In an exemplary embodiment of the present invention, a live registration of a camera-feed, using a digital scan as a reference is conducted by the method for registering and visualizing at least two images.

In another exemplary embodiment of the present invention, an image registration of two or more digital scans is conducted by the method for registering and visualizing at least two images.

In case of two or more digital scans, displacement information is sometimes directly available from the user interaction device (e.g. mouse, keyboard, or other devices used for navigation in the digital environment). Although this case doesn't require computation time for motion estimation, the difference between coarse visualization (only {Tx, Ty,R}) and refined visualization is still desirable to save on computational load of the server.

In order to perform a registration between two images, which may be high-resolution images, a subset of the following steps is performed:

A calculation of features is performed by means of SIFT, which is an algorithm in computer vision to detect and describe local features in images.

A calculation of the transformation, for instance is performed based on SIFT feature matching or based on correlation of projected intensities, which may be applicable for relatively small displacements, e.g. displacements below the threshold value.

A calculation of the local deformation is conducted, for instance, by matching local edge structures.

Transforming the image is performed only using the translation and the rotation. This may be performed by even scale.

As a further step, local deforming of one of the at least two images could be conducted.

Depending on the amount of time and/or computational load to be processed available which may be restricted by the viewing or loading delay of the requested viewport or the frame rate for which user experience is still pleasant, different strategies using the above mentioned steps are applicable. These steps may be mixed or simultaneously processed.

In another exemplary embodiment of the present invention, for large displacements, a coarse overview is presented rather than also applying local deformations. Therefore, a calculation of the local deformation and a local deforming of one of the at least two images can be ignored resulting in a coarse but acceptable registration, an acceptable high frame rate with limited delay.

In another exemplary embodiment of the present invention, in the case of small displacements, e.g. below a displacement threshold value, time or computational load can be saved, for instance by using a more efficient algorithm for motion estimation, for instance, based on correlation of projected intensities or by reusing information from the overlapping area with the previous frame. Then, the saved time can be used to compute local deformation and for visualization of local deformation.

In another exemplary embodiment of the present invention, actively panning and zooming is applied: In case the user is actively panning and zooming, compensation is performed for the translation and the rotation. While being active with panning and zooming, non-linear and/or fine details of the registration are not necessary and may be omitted.

In another exemplary embodiment of the present invention, no panning and/or zooming occurs, e.g. the user is not panning and/or zooming, the image is displayed using translation and rotation. Then, the calculation of the local deformation is started. Once, the local deformed image is available, the viewport is updated.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above.

Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it, which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network.

According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims.

However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims.

In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. Method for registering and visualizing at least two images, the method comprising:
measuring a navigation speed used by a user during a scrollable and/or zoomable visualization of a first image out of the at least two images and comparing the navigation speed with a navigation speed threshold value;
visualizing the first image by solving deformations of the first image using a first level of computational load, if the navigation speed is below the navigation speed threshold value; and
visualizing the first image by solving deformations of the first image using a second level of computational load, if the navigation speed is above the navigation speed threshold value,
performing a local registration of the at least two images, wherein the navigation speed used by the user during the scrollable and/or zoomable visualization of the first image is measured using a feature matching, and wherein: when the navigation speed is above the navigation speed threshold value, the solving of deformations of the first image using the second level comprises applying translational and rotational transformations; and, when the navigation speed is below the navigation speed threshold value, the solving of deformations of the first image using the first level comprises applying non-linear refinements.

2. The method according to claim 1, wherein solving deformations of the first image comprises an image translation of the first image, an image rotation of the first image, a scale variation of the first image, a further linear deformation of the first image or a non-linear deformation of the first image.

3. The method according to claim 1, wherein the navigation speed used by the user during the scrollable and/or zoomable visualization of the first image is obtained from a user interface device.

4. The method according to claim 1, wherein, when the navigation speed is above the navigation speed threshold value, the solving of deformations of the first image comprises applying transformations with a first resolution level; and, when the navigation speed is below the navigation speed threshold value, the solving of deformations of the first image comprises applying transformations with a second resolution level, wherein the first resolution level is lower than the second resolution level.

5. A non-transitory computer readable medium encoded with a computer program, which, when executed by a processor performs the steps of the method according to claim 4.

6. A controller for registering and visualizing at least two images, the controller comprising:
a memory that stores instructions; and
a processor that executes the instructions,
wherein, when executed by the processor, the instructions cause the controller to perform a method comprising: measuring a navigation speed used by a user during a scrollable and/or zoomable visualization of a first image out of the at least two images and comparing the navigation speed with a navigation speed threshold value:
visualizing the first image by solving deformations of the first image using a first level of computational load, if the navigation speed is below the navigation speed threshold value;
visualizing the first image by solving deformations of the first image using a second level of computational load, if the navigation speed is above the navigation speed threshold value; and
performing a local registration of the at least two images, wherein the navigation speed used by the user during the scrollable and/or zoomable visualization of the first image is measured using a feature matching, and wherein: when the navigation speed is above the navigation speed threshold value, the solving of deformations of the first image using the second level comprises applying translational and rotational transformations; and, when the navigation speed is below the navigation speed threshold value, the solving of deformations of the first image using the first level comprises applying non-linear refinements.

7. The controller according to claim 6, wherein, when the navigation speed is above the navigation speed threshold value, the solving of deformations of the first image using the second level comprises applying transformations with a first resolution level; and, when the navigation speed is below the navigation speed threshold value, the solving of deformations of the first image using the first level comprises applying transformations with a second resolution level, wherein the first resolution level is lower than the second resolution level.

8. An imaging system for digital image registration and visualization, the imaging system comprising:
an image processor configured to:
compare a navigation speed with a navigation speed threshold value, wherein the navigation speed is used by a user during a scrollable and/or zoomable visualization of a first image of the at least two images, wherein the navigation speed used by the user during the scrollable and/or zoomable visualization of the first image is measured using a feature matching;
when the navigation speed is below the navigation speed threshold value, visualize the first image by solving deformations of the first image using a first level of computational load;
when the navigation speed is above the navigation speed threshold value, visualize the first image by solving deformations of the first image using a second level of computational load, wherein, when the navigation speed is above the navigation speed threshold value, the solving of deformations of the first image using the second level comprises applying translational and rotational transformations, and, when the navigation speed is below the navigation speed threshold value, the solving of deformations of the first image using the first level comprises applying non-linear refinements;
perform a local registration of the at least two images; and
a display adapted to display the at least two images.

9. The imaging system according to claim 8, wherein solving deformations of the first image comprises an image translation of the first image, an image rotation of the first image, a scale variation of the first image, a further linear deformation of the first image or a non-linear deformation of the first image.

10. The imaging system according to claim 8, wherein the navigation speed used by the user during the scrollable and/or zoomable visualization of the first image is obtained from a user interface device.

11. The imaging system according to claim 8, wherein, when the navigation speed is above the navigation speed threshold value, the solving of deformations of the first image using the second level comprises applying transformations with a first resolution level; and, when the navigation speed is below the navigation speed threshold value, the solving of deformations of the first image using the first level comprises applying transformations with a second resolution level, wherein the first resolution level is lower than the second resolution level.

* * * * *